Dec. 8, 1970 C. F. GRICE 3,546,456

MULTIPLE DETECTOR SUBMARINE RADIOACTIVITY LOGGING SYSTEM

Filed Jan. 5, 1968

INVENTOR.
C. Fitzhugh Grice
BY John P. Sinnott
ATTORNEY

United States Patent Office 3,546,456
Patented Dec. 8, 1970

3,546,456
MULTIPLE DETECTOR SUBMARINE RADIOACTIVITY LOGGING SYSTEM
Charles Fitzhugh Grice, Houston, Tex., assignor to Schlumberger Technology Corporation, Houston, Tex., a corporation of Texas
Filed Jan. 5, 1968, Ser. No. 695,978
Int. Cl. G01v 5/00
U.S. Cl. 250—83.3
5 Claims

ABSTRACT OF THE DISCLOSURE

An illustrative embodiment of the invention shows a radioactivity logging device for measuring the density of the sediment on the bottom of a body of water. A housing containing a neutron or gamma radiation source is towed along the bottom to irradiate the sediment. Also within the housing, a pair of radiation counters that are spaced at different distances from the source respond to neutron reactions or those source radiations that are back-scattered to the housing by the sediment. These two counters indicate the sediment density, the quality of the contact with the bottom, and the homogeneity of the sediment.

BACKGROUND OF THE INVENTION

Field of the invention

This invention relates to prospecting techniques and, more particularly, to methods and apparatus that use radioactivity phenomena to identify the characteristics of underwater surfaces, and the like.

Description of the prior art

In order to erect off-shore drilling platforms and other structures in large bodies of water, the nature of the bottom that will support the platform must be thoroughly understood. For example, a suitable bottom for an off-shore drilling rig is characterized by a uniform sediment density. The shear strength of the sediment, moreover, also must be known in order to determine if the bottom can support the bearing pressure imposed by the rig's foundation. Borings, and similar techniques that have been suggested in the prior art for measuring these characteristics, are expensive, time consuming and do not provide a continuous density and homogeneity profile of the entire bottom in question.

Because the shear strength of the sediment often can be determined from density measurements, proposals have been advanced to tow a borehole density logging tool across the bottom under investigation. For well logging purposes, a tool of this sort ordinarily is drawn through a borehole to provide a continuous log of the density of an adjacent earth formation. The density is measured by emitting gamma radiation from a source within the tool to establish a gamma ray distribution within the formation. Those gamma rays that are scattered back by the formation to the tool are registered by a gamma ray counter that also is located within the tool housing. The signal from the counter provides an indication of the formation density.

Tools of this sort, when used under water, produce a reasonably accurate indication of the sediment density when the bottom is generally smooth. They produce a less exact response, however, when the bottom is even moderately rough because the roughness often tilts the working surface of the tool out of direct contact with the bottom. In this circumstance, the detector signal reflects not only bottom characteristics but also indistinguishably includes the characteristics of the water, a serious cause of error.

These tools also fail to indicate whether the sediment has a uniform density throughout the entire measured depth, and therefore affords a suitable bearing surface, or has one or more changes in density as a function of the sediment depth, and is thereby an unsatisfactory foundation support.

Accordingly, it is an object of the invention to provide an improved underwater density logging tool.

It is another object of the invention to provide a multiple detector underwater logging tool.

It is still another object of the invention to provide an improved radiation density tool for underwater profile logging.

It is still a further object of the invention to provide an improved tool for indicating changes in the density of a sedimentary layer under a body of water.

SUMMARY

In accordance with the invention, a tool for measuring characteristics of the bottom of a body of water comprises a fluid-tight housing, or skid, with the working surface that engages the bottom. A radioactive source within the housing located near the working surface emits radiations that penetrate the adjacent sediment. These radiations are scattered back to the skid through interaction with the sediment. Two radiation detectors positioned near the working face and spaced at different distances from the source housing respond to this back scattered radiation by generating signals that reflect the density and homogeneous character of the sediment. Transient increases in the signals from one or both of the detectors indicate that contact between the working surface of the skid and the bottom sediment has been broken.

More particularly, the skid is designed to be drawn or towed across the bottom surface. Within the skid, a source of gamma radiation, cesium 137 ($Cs^{137}$), for example, is spaced about two to nine inches from a Geiger-Müller counter that also is within the skid and located adjacent to the working surface. A gamma ray responsive scintillation counter, spaced about 12 to 24 inches from the source, also registers back scattered radiation. As hereinbefore disclosed, a substantial but transient increase in back scattered radiation registered by either one or both of the counters indicates that the contact between the working surface and the bottom was disrupted during the time of the observed transient.

The homogeneity of the sediment, moreover, is determined through a comparison of the two counter signals. Briefly, the depth of sediment density investigation characterized by the signal from the Geiger-Müller counter spaced close to the source is much more shallow than the 12″ to 16″ investigation depth provided by the scintillation counter. Accordingly, if the sediment is homogeneous, the density condition that is indicated by each of the two counter signals ought of be the same. If, however, the two counters register different sediment densities through their respective depths of investigation, the sediment density clearly is not homogeneous.

A typical two-counter apparatus embodying many of these principles for borehole logging application is described in more detail in U.S. Pat. No. 3,321,625 granted to John S. Wahl on May 23, 1967 for "Compensated Gamma-Gamma Logging Tool Using Two Detectors of Different Sensitivities and Spacings from the Source," and assigned to the same assignee as the invention described herein. As disclosed in the Wahl patent, a two-counter borehole density logging tool contrasts the signal from the short-spaced Geiger-Müller counter with the signal from the long-spaced scintillation counter in order to compensate for the effect of a mudcake layer of one density clinging to the wall of a borehole in a formation of a different density. These different depths of investigation enable the two counters to indicate a stratified or nonhomogeneous density condition in the earth formation under investigation.

In accordance with the invention, these foregoing principles are applied to an underwater logging skid to indicate a stratified density condition, at least within the first 12" to 16" below the bottom surface, through a comparison of the long-spaced and short-spaced radiation counter signals.

An alternative embodiment of the invention enables the bottom characteristics to be measured by emitting neutrons from a source within the skid. The neutrons ultimately are captured within the constituent nuclei of the bottom sediment that, in turn, emit "capture" gamma rays. These capture gamma rays are registered by one or more counters within the skid that are spaced from the source.

Because, for example, isotopes of oxygen within the surrounding water also absorb some of the irradiating neutrons and thereby produces capture gamma rays, the invention provides for a preferentially oriented gamma ray shield within the skid to reduce the detector sensitivity to those radiations that do not characterize the sediment. Neutrons scattered back to the skid by the environment, moreover, are absorbed by a coating of boron or some other neutron absorber within the skid structure. The neutrons so absorbed thus are prevented from inducing undesirable background gamma ray activity within the skid structure.

Consequently, the invention provides a sediment profile logging device that overcomes many of the unsatisfactory features inherent in prior underwater logging proposals.

For a better understanding of the present invention, together with other and further objects thereof, reference is had to the following description taken in connection with the accompanying drawings, the scope of the invention being pointed out in the appended claims.

DESCRIPTION OF THE PREFERRED EMBODIMENTS

Figure 1:
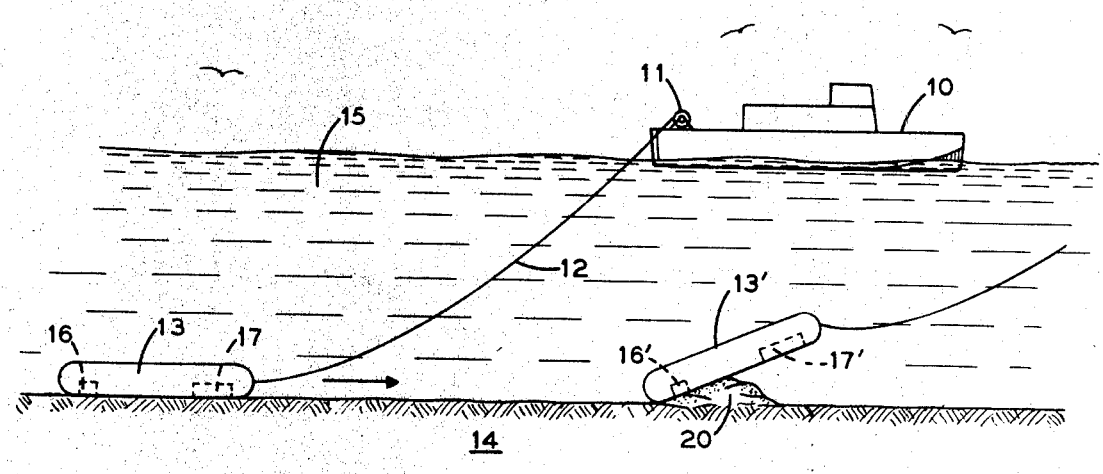
FIG. 1 shows a typical density profile logging apparatus in accordance with the invention.

As shown in FIG. 1, a vessel 10 has a winch 11 secured to the afterdeck to pay out and reel in an armored multiconductor cable 12 in order to tow a water-tight skid 13. The conductors (not shown) in the cable 12 supply electrical power to the skid 13 and transmit signals from apparatus within the skid to electrical circuits (not shown) on the vessel 10. The cable 12 is sufficiently slack to drag the skid 13 along the bottom surface 14 of a body of water 15 in the direction indicated by the arrow.

The skid 13 contains a radiation source 16 (preferably a gamma ray emitting $Cs^{137}$ capsule or a neutron emitting americium-beryllium mixture). As described subsequently in more complete detail, radiation detection apparatus 17 responds to the radiation pattern established by the bottom 14 as a consequence of the emissions from the source 16.

An obstruction 20 in the path of skid travel causes the skid 13' to tilt away from the bottom surface 14. Radiation emitted from the source 16' no longer penetrates only the bottom surface 14 but also irradiates an intervening portion of the body of water 15. The detection apparatus 17', moreover, also is separated from the bottom surface 14 and registers a radiation pattern that characterizes the water and the bottom surface 14.

Figure 2:
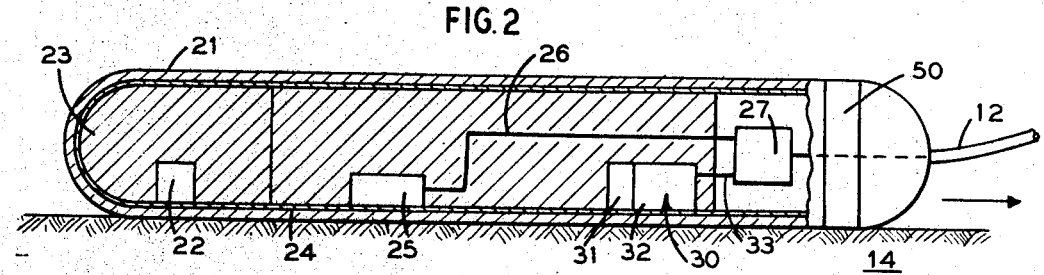
FIG. 2 is a schematic diagram of a typical density logging skid in accordance with the invention in full section in which the electrical circuits associated therewith are shown in block diagram form.

In accordance with the invention, the inaccurate character of the measurement arising from the poor quality of the contact between the bottom 14 and the skid 13' caused by the obstruction 20 is identified clearly by the apparatus shown in FIG. 2. The apparatus to be described alerts the log analyst to the unsatisfactory nature of the measurement made during an interval of poor bottom contact.

In FIG. 2, a typical water-tight skid housing 21 contains, for example, a 1.5 curie $Cs^{137}$ gamma ray source 22. The source 22 preferably is encased in a lead shield 23. The shield 23 is shaped to enable the source 22 to be secured within the housing 21 adjacent to a hardened working surface 24 in order to emit a collimated beam of gamma radiation that is directed toward the bottom surface 14. The working surface 24 closely engages the uppermost portion of the sediment to exclude water from this interface and thereby limit the skid's observations primarily to the sediment in the bottom surface 14.

Gamma rays emitted from the source 22 penetrate the sediment forming the bottom surface 14. Many of these penetrating gamma rays interact with the sediment and are scattered back toward the housing 21. These back scattered gamma rays are registered by a gamma ray counter 25 as, for example, a Geiger-Müller tube. Because each gamma ray detected by the tube 25 ionizes some of the contained filling gas, a charge pulse indicating a "count," or a detected radiation, is applied by the tube electrodes (not shown) to a conductor 26. The conductor 26 couples each of these counts to a circuit 27 which amplifies and scales the detected signal for transmission through conductors in the cable 12 through conductors in the cable 12 (FIG. 1) to appropriate electrical circuits on board the vessel 10.

The detector 25 is spaced from the source 22 in the vicinity of about two to nine inches, as measured from the center of activity of the source 22 to the effective center of the detector. The depth of investigation into the sediment provided by this short-spaced counter is quite shallow. Thus, the counts produced by the detector 25 provides a signal that is related to an average density of the sediment in the first few inches below the uppermost portion of the surface 14.

Gamma rays that penetrate the sediment more deeply, for example on the order of 12" to 16", are scattered back to the housing 21 and are registered by a detector 30 spaced from the source 22 by about 12" to 24". The detector 30 preferably comprises a crystal 31 that responds to the incident gamma radiation by producing a transient flash of light. A photomultiplier tube 32 optically coupled to the crystal 31 responds to these flashes by producing electron charge pulses, or counts, that are sent through a conductor 33 to the circuit 27 for transmission through the cable 12 (FIG. 1) to the vessel 10 as hereinbefore described.

Figure 4:
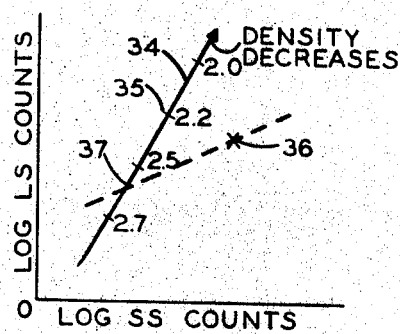
FIG. 4 is a diagrammatic representation illustrating the relationship between the signals from the instrument of FIG. 2 that indicates the degree of sediment homogeneity.

The signals from the detectors 25 and 30 are analyzed with the aid of electrical circuits (not shown) on the vessel 10. Typically, circuits of this character comprise logarithmic scaling circuits for converting the signals from each of the counters into a value that corresponds to the logarithm of the number of counts registered by each respective counter. These logarithmic signals then are combined in a function former circuit (also not shown) according to a predetermined relationship, as shown illustratively in FIG. 4. The function former circuit simulates in response a curve 34 that reflects the density of the sediment in the bottom 14.

Typically, a function former circuit of this sort comprises an operational amplifier with input and feedback resistances that vary the output from the amplifier to match the slope of the curve 34. Thus, for example, signals that correspond to the logarithms of the detected counts from the tube 25 (SS) and the crystal 31 (LS) are combined to identify a point 35 on the curve 34 which indicates that the density of the sediment is 2.2 grams per cubic centimeter (gm./cc.). Because the signals from both counters identify a point on the surve 34, the sediment in the bottom 14 has a uniform density throughout the depth of investigation characterizing the tool in question.

If, however, the signals combine to identify a point 36 that is not on the curve 34 of uniform density throughout the depth of investigation, but to one side of this curve, the density of the bottom 14 observed by the short-spaced counter 25 is different from the density registered by the long-spaced counter 30. In this circumstance, there necessarily must be a difference or change in the density of the sediment at least within the depth under investigation.

The actual density of the sediment registered by the long-spaced counter 30 can be determined by using the "spine and ribs" plot described in more complete detail in the aforementioned Wahl patent. Accordingly, if the plotted point 36 is corrected by being moved downward and to the left at an angle of about 45° to a point 37 of intersection with the curve 34, the corrected point 37 indicates the actual density of the deeper layer of sediment observed by the long-spaced detector 30.

As hereinbefore described, if an obstruction on the bottom 14 causes the skid 13 to break contact with the bottom surface, the count rate registered by either or both of the counters 25 and 30 will immediately increase and then subside as soon as good surface contact is re-established. Observation of these transient count rate peaks on the vessel 10 (FIG. 1) enables the log analyst to disregard the data acquired during intervals of unsatisfactory contact, and thereby interpret the bottom characteristics more accurately.

Figure 3:
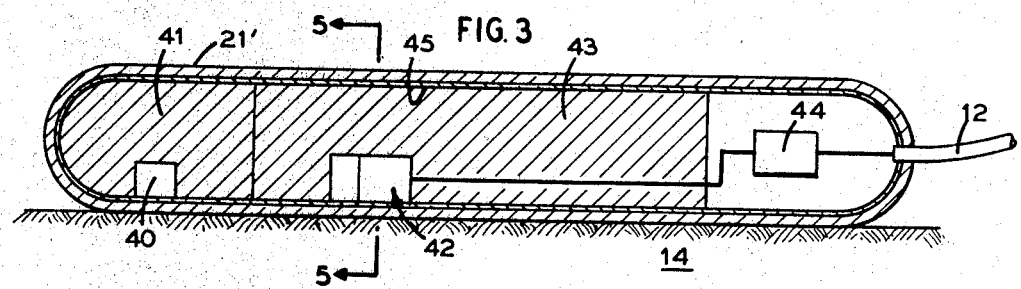
FIG. 3 is a schematic diagram in full section of an alternative embodiment of the invention.

In the alternative embodiment of the invention shown in FIG. 3, a neutron source 40 adjacent to the working surface of the housing 21' provides a beam of neutrons for irradiating the bottom surface 14. A neutron reflecting shield 41 of copper or the like is interposed between the housing 21' and the source 40 and preferentially scatters the neutrons toward the bottom 14 to enhance the collimating effect of the eccentric source position.

As hereinbefore described, the neutrons emitted from the source 40 irradiate the constituent elements in the sediment and produce capture gamma rays that are scattered back to a detector 42, which also is positioned within the housing 21' adjacent to the working surface. Because some of the neutrons nevertheless diffuse through the body of water 15 and are absorbed by oxygen nuclei, the water 15 produces an undesirable capture gamma radiation background that tends to mask the gamma radiation emanating from the sediment on the bottom 14. A gamma radiation shield 43, of lead or the like, is interposed between a scintillation counter and the portion of the housing not in contact with the bottom 14. The shield 43 thereby establishes a collimated aperture through which gamma radiation from the bottom sediment is registered by the counter 42.

The radiation equipment shown in the embodiment of the invention in FIG. 3 is especially useful for neutron activation analysis, wherein the constituent elements in the sediment are identified through their respective capture gamma rays. For this purpose, a transmission circuit 44 is provided within the housing 21. The circuit 44 preferably comprises a 256 or a 400 channel pulse height analyzer. The pulse height analyzer segregates signals received from the scintillation counter 42 into distinct memory units individual to each respective channel in accordance with the observed energy, or pulse height, of the detected radiations.

In operation, the housing 21' is dragged on the bottom for approximately one minute at about two knots. At the end of the minute, a programmer (not shown) on the vessel 10 (FIG. 1) interrogates the memory in the pulse height analyzer to transmit the stored information from the transmission circuit 44 through the cable 12 to the surface.

To enhance the pulse height resolution of the detector 42, a further embodiment of the invention contemplates the installation of several scintillation counters within the housing 21'. These counters are so arranged mechanically and electrically that double and triple coincidence and anticoincidence counting capabilities are available while logging.

Figure 5:
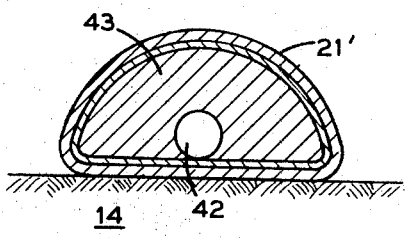
FIG. 5 is a section taken along the line 5—5 of FIG. 3 and looking in the direction of the arrows.

Other counters are suitable for use in accordance with the invention, as for example, semiconductor detectors and the like. In order to eliminate serious neutron activation of the skid structure, a coating 45 of boron or an equivalent neutron absorbing material is deposited on the interior surface of the housing 21'. The tendency of the housing 21' to roll during towing is reduced by providing a flat working surface for the housing, as shown in FIG. 5. Torsion forces on the cable 12, moreover, are eliminated through the use of a swivel head 50 (FIG. 2) which enables the housing 21 to rotate freely about a longitudinal axis and thereby saves the cable from being twisted.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A skid for measuring characteristics of the bottom of a body of water comprising, a housing having a substantially flat working surface for contact with the bottom to exclude essentially all of the water from the contact between said working surface and the bottom, means for towing the skid on the bottom of the body of water, swivel means for relieving torsion forces developed in said towing means through free rotation about the longitudinal axis of said housing, a source of radiation within the housing adjacent to said working surface, and a plurality of radiation counters spaced from said source and adjacent to said working surface for indicating characteristics of the bottom at different depths from said working surface.

2. A skid according to claim 1 comprising, a radiation shield interposed between said radiation counters and the body of water to absorb radiation emanating therefrom.

3. A skid for measuring the composition of the bottom of a body of water comprising, a housing having a substantially flat working surface for contact with the bottom to exclude essentially all of the water from the contact between said working surface and the bottom, means for towing the skid on the bottom of the body of water, swivel means for relieving torsion forces developed in said towing means through free rotation about the longitudinal axis of said housing, a neutron source within the skid, a capture gamma ray counter within the skid and spaced from said neutron source, a multichannel pulse height analyzer within the skid coupled to said counter and responsive thereto, a memory storage within the skid and responsive to said pulse height analyzer for storing signals therefrom, and circuit means coupled to said memory storage for interrogating said storage to transmit said stored signals from the skid.

4. A skid according to claim 3 comprising a neutron absorbing medium within the skid to prevent thermal neutron activation thereof.

5. A skid according to claim 3 wherein said capture neutron gamma ray counter comprises a plurality of individual gamma ray detectors for neutron activation analysis.

References Cited

Radioactivity-and Density-Measuring Devices for Oceanographic Studies, by Carl M. Bunker, from Geological Survey Research, 1964, pp. D65–D69.

ARCHIE R. BORCHELT, Primary Examiner

U.S. Cl. X.R.

250—43.5, 83.6